United States Patent [19]

Lewis

[11] Patent Number: 4,640,032

[45] Date of Patent: Feb. 3, 1987

[54] WIRE AND CABLE ORGANIZING SLEEVE

[75] Inventor: George L. Lewis, Westminster, Colo.

[73] Assignee: AT&T Information Systems Inc., Holmdel, N.J.

[21] Appl. No.: 633,643

[22] Filed: Jul. 23, 1984

[51] Int. Cl.⁴ .............................................. G09F 3/00
[52] U.S. Cl. .................................... 40/316; 40/21 R; 40/10 R
[58] Field of Search ................... 40/2, 10, 316, 21, 23, 40/20

[56] References Cited

U.S. PATENT DOCUMENTS

| | | | |
|---|---|---|---|
| 3,088,237 | 5/1963 | Plummer | 40/316 |
| 3,459,878 | 8/1969 | Gressitt | 40/316 |
| 3,484,974 | 12/1969 | Culmone | 40/316 |
| 3,525,376 | 8/1970 | Muhlhauser | 150/52 |
| 3,863,412 | 2/1975 | Bodycomb et al. | 52/483 |
| 4,142,565 | 3/1979 | Plunkett, Sr. | 150/52 R |
| 4,415,765 | 11/1983 | Iwasa et al. | 174/72 A |
| 4,417,612 | 11/1983 | Couture et al. | 150/40 |
| 4,433,783 | 2/1984 | Dickinson | 206/484 |

Primary Examiner—Gene Mancene
Assistant Examiner—Wenceslao J. Contreras
Attorney, Agent, or Firm—Donald M. Duft

[57] ABSTRACT

A flexible organizing sleeve device for ordering a plurality of elongated members such as wire and/or cables. The sleeve comprises at least two sheets of flexible material having substantially the same dimensions of width, length and thickness. The interior facing surface of each sheet has attached thereto a plurality of resealable parallel mating strips running substantially along the length of the sleeve. To install the device, a user mates the first pair of parallel mating strips and places a wire, for example, next to the mated strips between the sheets. A user then mates the next consecutive pair of parallel mating strips. The wire is now contained within a compartment-like structure. The user simply repeats the mating process of forming separate and individual compartments for each wire until the entire organizing sleeve is filled and the plurality of wires are ordered.

2 Claims, 5 Drawing Figures

WIRE AND CABLE ORGANIZING SLEEVE

TECHNICAL FIELD

This invention relates to wire and cable organizers and, in particular, to a wire and cable organizing sleeve for consecutively ordering a plurality of wires and cables.

BACKGROUND OF THE INVENTION

When several pieces of equipment are colocated and, in particular, cooperatively colocated such as telephone subscriber equipment (which includes telephones, terminals, modems, and other special feature attachments), numerous wires and cables of some length extend from the equipment to an outlet. The number of wires and cables needed vary with the amount and type of equipment present. However, where several pieces of equipment are colocated, there is a tendency for these wires and cables extending from this equipment to become intertwined, entangled and unorganized. This occurs as a result of the shifting and moving about of the pieces of equipment.

Several problems are associated with a plurality of wires and cables extending from colocated electrical equipment. One such problem results in the execution of maintenance procedures. The entanglement of wires and cables makes maintenance a time-consuming and frustrating procedure. For example, several maintenance procedures require that the wire or cable extending from a piece of electrical equipment be disconnected from the outlet. Tracing the specific wire or cable from the associated piece of equipment requiring maintenance is virtually impossible when that particular wire or cable is intertwined with many others. Therefore, the possibility exists that the wrong piece of equipment is disconnected which then effectively prevents efficient and safe maintenance.

A second problem associated with entangled wires or cables is the risk of harm to a person or damage to a piece of equipment. For example, if the wires or cables extending from the equipment are lying on the floor, a person's foot may become entangled in the mass of wires or cables. Additionally, the yanking of the wires and cables by the person's foot could cause the equipment to become dislodged and fall on the floor causing equipment damage. An entangled mass of wires or cables on the floor may be hazardous both to the equipment and to the person.

Additionally, the appearance of a bulky mass of wires and cables is not necessarily aesthetically pleasing. Therefore in an environment where appearance is important, such as a reception area in a business office, a bulky mass of wires and cables presents an unattractive picture to a potential business customer.

Several conventional wire and/or cable harnesses are available. One type of harness affixes to a permanent, immovable surface. The wires or cables are restrained via the permanently secured harness. The disadvantage associated with this design is that a user is prevented from moving the equipment easily and is required to locate the equipment semi-permanently. Other conventional wire and/or cable harnesses are inflexible clamp-like structures having consecutively ordered containment portions. Although these harnesses are not affixed, these devices can not accommodate every environment since these harnesses can not conform to angles and bends. Again, the user is limited as to equipment location. Additionally, each containment portion only secures a small portion of wire and/or cable along the length of the wires and/or cables extending from colocated equipment and, therefore the wires and/or cables above or below the device may still become entangled. Applying several discrete harnesses of this type may alleviate the entanglement problem, but the expense and the unattractive appearance of such an arrangement are prohibitive factors. Further, the wires and/or cables may be collectively secured by a single device such as a circular clamp, but then the wires and/or cables are merely bundled rather than organized and ordered.

Therefore, it would be advantageous to provide a flexible and easily installable device that aesthetically and safely orders and organizes the variety of wires and cables extending from a plurality of colocated electrical equipment.

SUMMARY OF THE INVENTION

The present invention overcomes the problems associated with numerous wires and/or cables extending from a variety of colocated electrical equipment by providing a flexible wire and cable organizing sleeve to individually order the wires and/or cables. The sleeve comprises two sheets of flexible material, for example plastic, having substantially the same proportions. The interior facing surfaces of the sheets have attached thereto a plurality of parallel mating strips of, for example, the hook and loop type, i.e., VELCRO. A user mates the first pair of strips and then places a first wire and/or cable next to the mated strips. Thereafter, the user mates the next adjacent pair of strips. This secures the first wire and/or cable in a compartment-like structure. The next wire and/or cable is compartmentalized in the same manner. This process continues repetitively until the entire wire and/or cable sleeve is filled.

The disclosed sleeve organizes and orders wires and/or cables extending from a variety of electrical equipment. The sleeve may be customized to accommodate a wide range of lengths, numbers and sizes of wires and/or cables commonly found associated with electrical equipment. Following customized construction, a user may easily install and remove the sleeve from the wires and/or cables as needed because of the resealable type of parallel mating strips used.

The disclosed wire and/or cable organizing sleeve provides several advantages. One advantage is that since the sleeve serves to organize and order wires and/or cables, maintenance procedures are more effectively and efficiently executed. Additionally, the sleeve covers a larger length of the wires and/or cables. This prevents the wires and/or cables from becoming entangled above or below the organizing sleeve. Further, since the organizing sleeve contains the wires and/or cables, the probability of physical injury to a customer and damage to electrical equipment is less likely. Additionally, since the sleeve is constructed of flexible material, the sleeve may be located on any portion along the length of the wires and/or cables and can conform to the bends and angles found in the wire and/or cable path from the electrical equipment to the outlet. Another advantage of the sleeve is that the sleeve material may be any color to accommodate a variety of decors and to be aesthetically compatible with a user's environment.

DETAILED DESCRIPTION

The disclosed flexible sleeve device is adaptable for a variety of uses where numerous elongated members occupying the same area require organization and ordering. Such elongated members may include ropes, tubing, wires, cables, etc. For ease of description, however, the remainder of this specification describes the use of the organizing sleeve for wires and/or cables.

Figure 1:
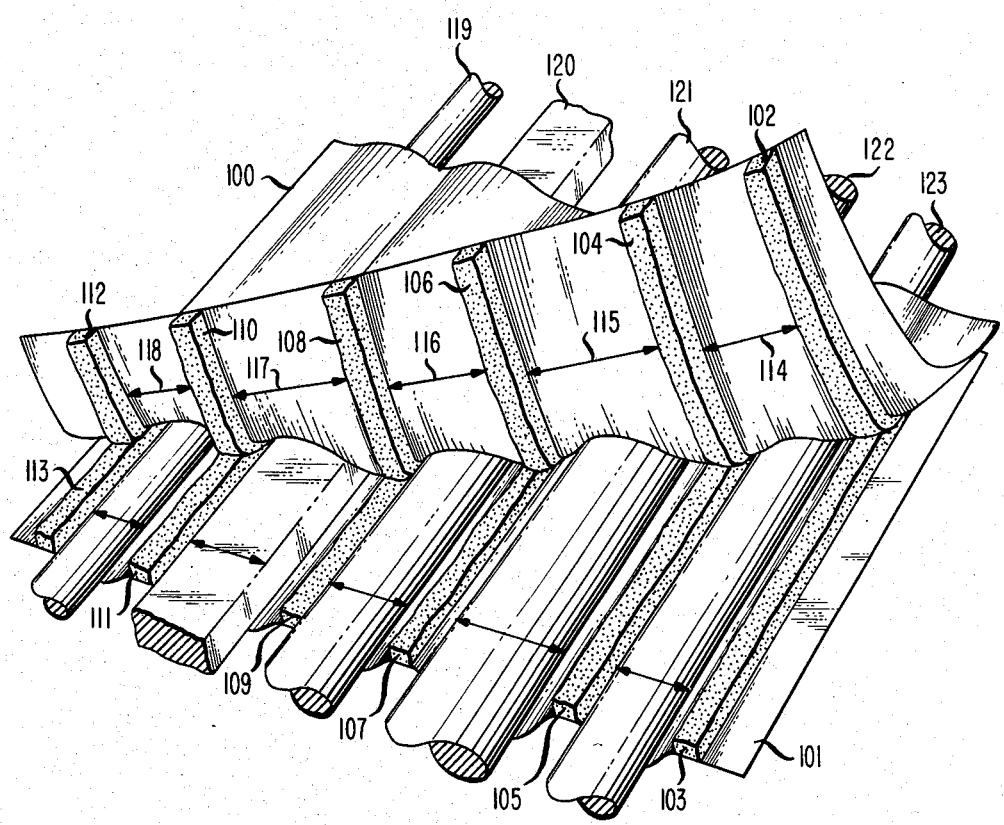
FIG. 1 illustrates a top perspective view of a partially closed wire and cable organizing sleeve containing a variety of wires and cables.

FIG. 1 illustrates a top perspective view of a partially closed wire and cable organizing sleeve containing different sizes and shapes of wires 119 through 123. The organizing sleeve serves to individually separate and compartmentalize the wires extending from colocated electrical equipment. More than one wire may occupy a compartment at one time. However, for ease of description, assume that there is one wire per compartment. The organizing sleeve comprises two superposed matching sheets 100 and 101, respectively, of flexible material and spatially separated parallel mating strips 102 through 113 having a top portion strip 102, 104, 106, 110 and 112, and a bottom portion strip 103, 105, 107 109, 111 and 113 which when mated provides a resealable contact. The length and width of the matching sheets 100 and 101 vary with respect to the number and length of wires extending from colocated electrical equipment. The width is minimized so that the entire collection of wires is confined to a small amount of physical space. This arrangement provides easy access. The length is such that a user may conveniently manage installation and removal of the entire sleeve, and prevent the collection of wires from becoming entangled either above or below the area of sleeve placement. The sleeve may be placed on any portion along the length of the wires. Since the sleeve is made of flexible material, the organizing sleeve conforms and adapts to its physical placement which may include angles, twists, bends, and folds.

The organizing sleeve may be customized to the user's specification in order to accommodate a wide range of sizes and shapes of wire commonly found extending from a variety of colocated electrical equipment. The organizing sleeve orders and separates each individual wire, and provides a single compartment for each of the specified wires. The compartments for each wire 119-123 are formed between two pairs of parallel mating strips 102-113. The size of each compartment exceeds the size of the specified wire contained in each individual compartment.

Figure 2:
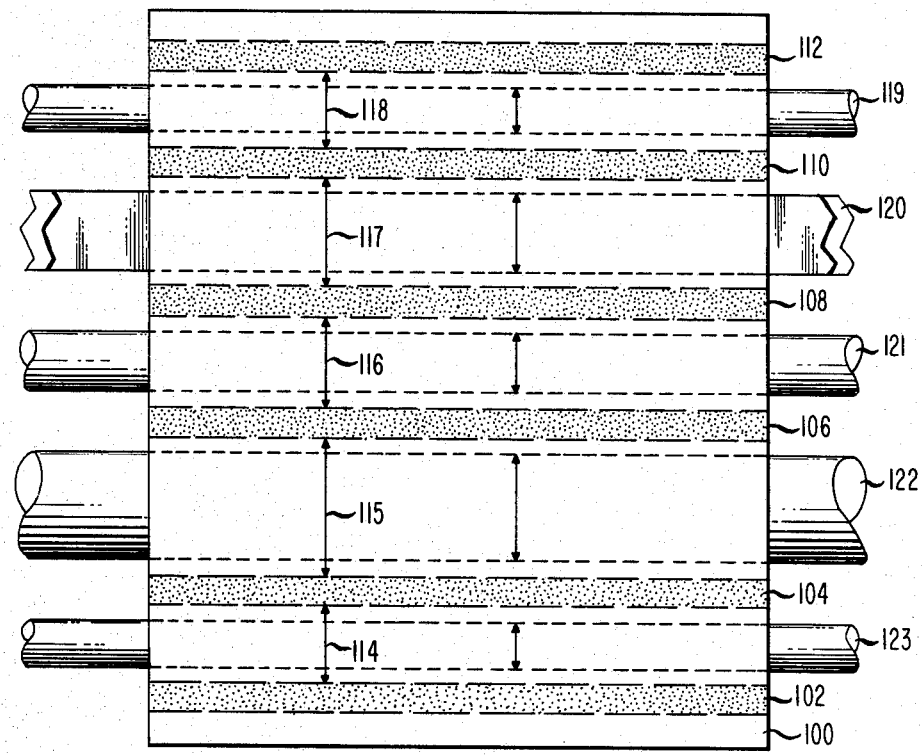
FIG. 2 illustrates a top plan view of the wire and cable organizing sleeve of FIG. 1.

FIG. 2 illustrates a top plan view of the organizing sleeve which shows that the size of the wires 119-123 are smaller than the size of the compartments 114-118 accommodating each individual wire. The top and bottom portions of each compartment contact the wires to restrict up/down movement within each individual compartment. However, lateral movement is not totally restricted. Allowing a relatively small amount of side-to-side type movement relieves stress when pressure or force is applied to the organizing sleeve. This prevents the seals which form the compartments from becoming disengaged, and therefore prevents the wires from becoming intermingled and entangled. The organizing sleeve is sufficiently "snug" around the collection of wires to prevent up or down sliding movement along the length of the wires extending from the colocated electrical equipment.

Organizing Sleeve Components

Figure 3:
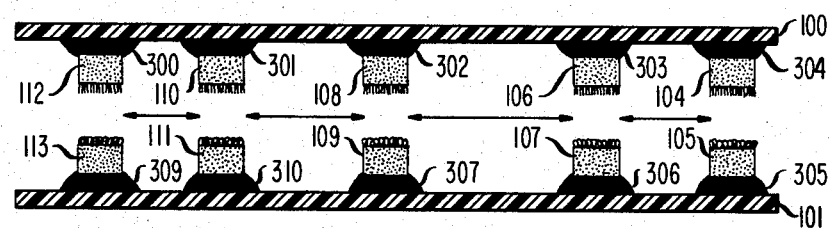
FIG. 3 illustrates a cross sectional end view of the wire and cable organizing sleeve of FIG. 1 showing the elements comprising the structure of the sleeve.

FIG. 3 illustrates a cross sectional side view showing the components comprising the organizing sleeve. The flexible material 100 and 101, respectively, may be any type of flexible material such as an opaque or clear plastic or colored vinyl. It is recommended that the sheets maintain a sufficient minimum thickness in order to support the wires, and an appropriate maximum thickness in order to allow the bending, twisting, folding and angling movement associated with the organizing sleeve placement along the length of the wires following sleeve installation. The availability of plastic in a variety of colors allows the user to aesthetically accommodate a variety of environments.

Assume the user has specified the length and width of the plastic sheets, 100 and 101 respectively. Assume further that the user has specified the sizes of the wires to fill each compartment within the sleeve, and that the size of each compartment has been appropriately calculated to accommodate the specified wire. As previously described, the parallel mating strips comprise a top strip 104, 106, 108, 110 and 112 and an opposite matching bottom strip 105, 107, 109, 111 and 113. Each pair of parallel mating strips defines a compartment edge. The edges are spatially separated in order to accommodate the specified wire. The spatial separations need not be equidistant, but may be as spatially diverse as required by the user to accommodate the various wire sizes. The strips, top and bottom, are securely attached to the interior facing surfaces of the plastic material sheets 100 and 101, respectively, by any type of commercially available adhesive or by sewing. For descriptive purposes, each portion of the mating strips shown in FIG. 3 is securely fastened by epoxy 300-309 to the plastic sheets 100 and 101 to form a permanent bond.

The parallel mating strips 104-113 are of the resealable type that may contact and re-contact innumerable times. It is suggested that the parallel mating strips be of the hook and loop type known under the trade name of VELCRO. VELCRO comprises two coacting portions or pieces of material having the same dimensions. One portion, for example, 104 comprises a multitude of tiny hooks, and the other portion, for example, 105 comprises a multitude of tiny loops. When the hooks and loops are contacted and pressure is applied by an external force to both portions, i.e., to the exterior surfaces of sheets 100 and 101, respectively, a secure seal is formed. The seal precludes any movement between the top and bottom portions of the VELCRO strips once a seal is made. To disengage the two coacting portions, it is merely necessary to grasp the edges of the VELCRO strips or material to which it is attached, i.e., sheets 100 and 101, and pull apart with sufficient force in a perpendicular manner the two strip portions in order to break the seal. In this manner, the seal easily engages and disengages as required.

VELCRO strips come in a number of lengths and widths. As shown in FIG. 2, the strips 102, 104, 106, 108, 110 and 112 run along the length of the interior surface of the organizing sleeve. It is suggested that an uninterrupted strip length be used to form each individual compartment edge and that the VELCRO maintain minimum a width since only a small area of VELCRO can maintain a secure closure. An additional advantage in using VELCRO is that the integrity of the flexible plastic remains intact since VELCRO, itself, is flexible.

Although the described embodiment utilizes VELCRO parallel mating strips, other methods of forming a compartment or compartments are available. For example, the sheets may have sticky parallel mating strips and when the strips contact, an adhesive bond is formed; or only one of the pair of sheets may have a sticky surface and the other sheet adheres following contact. Another example is that the sleeve may comprise magnetic parallel mating strips which may be attached to or embedded within the plastic sheets, and which when contacted result in a secure closure. Additionally, the sheets comprising the sleeve may have inherent magnetic properties which when contacted form a secure closure to compartmentalize the wires. Numerous substitutions are available for forming a compartment or compartments within the organizing sleeve. For ease of description, the remainder of this description specifies VELCRO as the material utilized for forming the organizing sleeve compartments.

The above description identifies the purpose, components and construction of the organizing sleeve. The remainder of this description explains how the user applies the sleeve to a collection of wires and/or cables extending from colocated electrical equipment.

Application of the Organizing Sleeve

Figure 4:
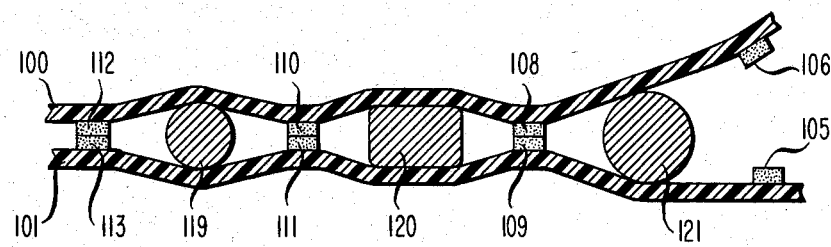
FIG. 4 illustrates a cross sectional end view of a fragmentary portion of the wire and cable organizing sleeve of FIG. 1 in a partially closed state.

Assume that the appropriate compartment spaces have been calculated. FIG. 4 shows a partial cross sectional side view of the wire organizing sleeve of FIG. 1. In particular, wires 119 and 120 are contained in their respective compartments as formed by VELCRO strip portions 112 and 113, 110 and 111, and 108 and 109, respectively. To create an additional compartment for a wire, such as wire 121, the user places specified wire 121 substantially against the edge of the VELCRO seal having portions 108 and 109. While holding wire 121 in place between the two sheets 100 and 101, respectively, the user applies pressure to the sheets in order contact VELCRO strip portions 106 and 105, respectively. A secure seal results from the pressure contact, and the user forms a compartment containing wire 121.

Figure 5:
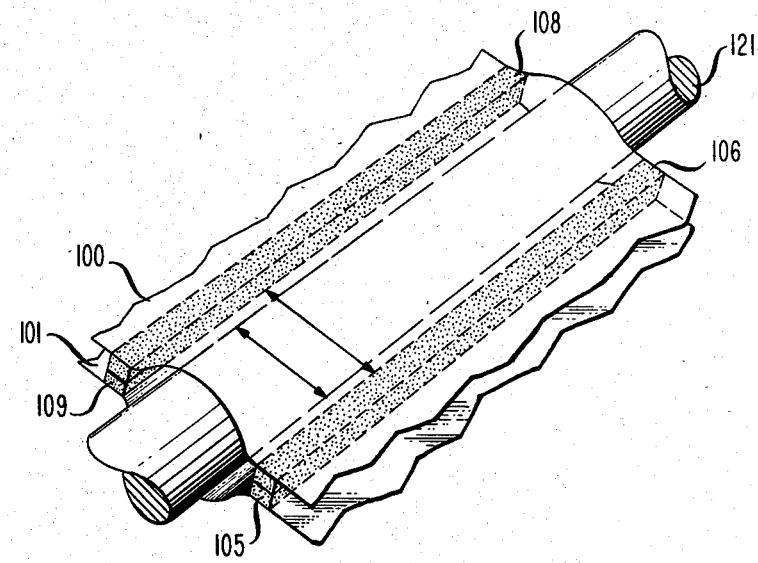
FIG. 5 illustrates a top perspective view of a fragmentary portion of the wire and cable organizing sleeve of FIG. 1 in a completely closed state.

FIG. 5 is a perspective view of a fragmentary portion of the compartment containing wire 121. Wire 121 is completely enclosed within the compartment between two coacting pairs of VELCRO closures. The top and bottom interior facing surfaces of the compartment contact the wire so as to restrict gross movement. However, the side interior facing edges of the compartment are not in contact with the wire, and therefore some side-to-side movement of the wire may occur when outside pressure or stress is applied to the organizing sleeve.

To apply the entire organizing sleeve to the collection of wires as shown in FIG. 1, the user simply repeats the above described process of forming separate and individual compartments for each wire until the entire organizing sleeve is filled. FIG. 1 illustrates a fully utilized organizing sleeve accommodating a variety of sizes and shapes of wires.

The described cable and wire organizing sleeve serves to aesthetically organize and order a plurality of wires and/or cables extending from colocated electrical equipment. A user easily applies and removes the sleeve when necessary since the sleeve comprises resealable pairs of parallel mating strips. The flexible organizing sleeve is capable of adapting to a variety of bends, twists, angles and curves along the wire and/or cable path.

While a specific embodiment of the invention has been disclosed, variations in structural detail, within the scope of the appended claims, are possible and are contemplated. The above-described arrangements are only illustrative of the application of the application of the principles of the invention. Normally, other arrangements may be devised by those skilled in the art without departing from the spirit and the scope of the invention.

What is claimed is:

1. A wire and cable organizing sleeve for individually ordering a plurality of specified wires or cables of differing gauges and lengths comprising:
   at least a pair of flexible plastic sheets having interior facing surfaces and exterior facing surfaces for forming said sleeve;
   a plurality of a first type of elongated base strips distributed along the length of and affixed to an interior facing surface of a first sheet of each pair of said plastic sheets with said first type of elongated strips having a plurality of deformable hooks bonded to and randomly distributed over the length of and extending outwardly from said first type of elongated strips;
   a plurality of a second type of elongated base strips distributed along the length of and affixed to an interior facing surface of a second sheet of each pair of said plastic sheets with said second type of elongated strips having a resilient pile of looped filaments bonded to said second type of elongated strips and extending outwardly therefrom over substantially the entire length thereof, said hooks of said first type of elongated strips being adapted to releasable engage said looped filaments of said second type of elongated strips; and
   at least two or more spatially separated adjacent ones of said first type of elongated strips having a one to one correspondence in a facing relationship to a like number of spatially separated adjacent ones of said second type of elongated strips for cooperatively joining said first and second interior facing surfaces of at least a pair of said plastic sheets;
   wherein when said first and second type of elongated strips interposed between said first and second interior facing surfaces of said sheets are joined, the relative movement between said joined plastic sheets is inhibited;
   wherein said first and second type of elongated strips are secured to all of said first and second interior facing surfaces of said plastic sheets by an adhesive substance;
   wherein said plurality of wires or cables are secured between two spatially separated adjacent pairs of said first type of elongated strips having said correspondence to said second type of elongated strips such that there exists at least an equivalent number of spatial separations to an equivalent number of specified wires or cables.

2. A flexible wire and cable organizing sleeve for ordering a plurality of wires or cables comprising:

a cooperating pair of flexible plastic sheets presenting opposite long and short dimensional sides arranged in a superposed relation for forming said sleeve by cooperatively joining said pair of flexible plastic sheets;

at least two or more spaced apart parallel elongated base strips of a first type securely engaged to a first one of said pair of plastic sheets having a plurality of deformable hooks bonded to and randomly distributed over the length of and extending outwardly from said first type of elongated base strips;

at least two or more spaced apart parallel elongated base strips of a second type securely engaged to a second one of said pair of plastic sheets having a resilient pile of looped filaments bonded to said second type of elongated base strips and extending outwardly therefrom over substantially the entire length thereof, said hooks of said first type of elongated base strips being adapted to releasable engage said looped filaments of said second type of elongated base strips;

at least two or more spaced apart parallel adjacent ones of said first type of elongated base strips having a facing relationship to a like number of spaced apart parallel adjacent ones of said second type of elongated base strips for cooperatively joining said pair of plastic sheets; and wherein when said first and second types of elongated base strips being interposed between a first one and a second one of said pair of plastic sheets are joined, the relative movement between said pair of joined plastic sheets is inhibited;

wherein said first and second types of elongated base strips are secured to said first and second ones of said pair of plastic sheets by an adhesive substance;

a plurality of compartments formed between joined adjacent pairs of said first and second types of elongated base strips having said facing relation to each other for securing each one of said wires or cables where each compartment maintains a short direction spacing slightly larger than an associated wire or cable;

wherein each of said compartments allows said associated wire or cable to be displaced about each of said compartments to prevent rupturing the joined adjacent pairs of said first and second types of elongated base strips when an external force or pressure stresses in-part or in-whole said sleeve.

* * * * *